M. Stubbs,
Steam-Engine Valve-Gear,
Nº 8,863.
Patented Apr. 6, 1852.
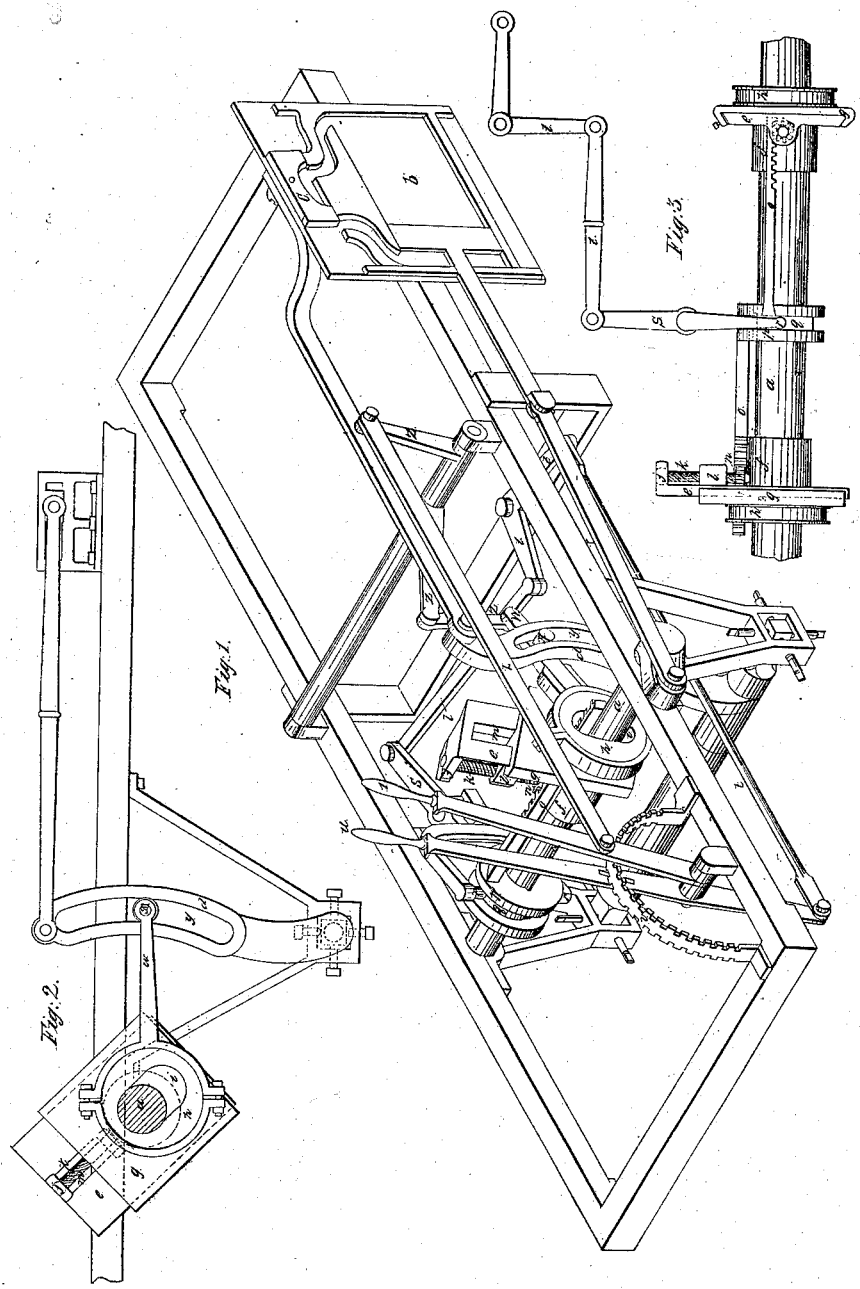

UNITED STATES PATENT OFFICE.

MATHEW STUBBS, OF CINCINNATI, OHIO.

MECHANISM FOR ACTUATING AN ADJUSTABLE ECCENTRIC.

Specification of Letters Patent No. 8,863, dated April 6, 1852.

*To all whom it may concern:*

Be it known that I, MATHEW STUBBS, of Cincinnati, Hamilton county, Ohio, have invented new and useful Improvements in the Valve-Gearing of Steam-Engines; and I do hereby declare the following to be a full, clear, and exact description of the nature, construction, and operation thereof, reference being had to the annexed drawings, making part of this specification.

It is my aim in these improvements, to simplify, add security to, and extend the usefulness of the eccentric movement of steam slide valves, by such an arrangement of a single sheave, as to capacitate it for reversal, arrestment or other modification of its action by the engineer; and this I propose to effect in such a manner as to guard against any liability to work loose or become unsteady, a matter of great moment when it is considered that fatal accidents have frequently arisen from inefficiency of the shifting apparatus of steam engines, especially of locomotives.

In the annexed drawings Figure 1 is a perspective view of my apparatus. Fig. 2 is a side elevation. Fig. 3 is a view parallel with the axle or shaft of the apparatus as applied to two cylinders.

The same letters refer to like parts throughout.

($a$) is the main or driving axle or shaft. ($b$) represents diagrammatically the cylinder, and ($c$) the valve. ($d$) is a vibrating arm or lever to which the valve rod is attached and which is actuated by the within described eccentric movement. Keyed or otherwise firmly attached at right angles to the driving axle is a plate or head ($e$) having a hub ($f$) for its more secure relation to its bearings. This head has beveled edges which are clipped tightly by the sliding stock ($g$) of an eccentric sheave ($h$). The opening ($i$) in the center of the sheave is oblong in order to allow of the play of the sheave upon the axle while the former is shifted, and is sufficient to allow the said sheave to range on each side of the center a distance equal to the maximum eccentricity desired.

Socketed to a lug ($j$) upon the head ($e$) and to the hub ($f$) is a screw ($k$) having a rapid pitch of thread. Upon this screw plays a nut ($l$) projecting from the sliding sheave stock through a slot ($m$) in the head, which allows it the requisite play. Thus by turning the screw one way or the other the sheave may be made to recede from, approach or pass over the center of rotation (thus reversing the motion) or it may be held precisely concentric with the said center. The shifting motion is placed under control of the engineer as follows: ($n$) is a pinion made fast to the screw, and into this pinion gears a rack ($o$) which projects from a sliding box or collar ($p$) so tongued to the axle as to revolve with but be capable of sliding along it. This sliding box ($p$) is grooved ($q$) so as to receive the points ($r$) of a yoke ($s$), the counter arm of which is connected by suitable rods and levers ($t$) to a brake or hand bar ($u$) of usual construction. This bar may be accompanied by a segment plate ($v$) notched and indexed so as to indicate the different corresponding positions of the sheave, so that the engineer may easily by the management of this brake either reverse the position of the valve and the motion of the engine, or he may by holding it in the middle position shut off the steam altogether—a feature of great value when (as is sometimes the case) the throttle valve fails to act.

The free extremity of the eccentric rod ($w$) is provided with a pin or roller ($x$) which occupies a slot ($y$) in the vibrating arm ($d$), the said slot and arm being so curved, as to be concentric with the axis of the driving shaft when the arm is in its central position.

The pin ($x$) may be moved up and down within this slot, and there takes place a greater or less sweep of the summit of the arm ($d$) according to the height upon the arm to which it is fixed and this being placed under control of the engineer, by a system of rods and levers ($z$) connecting to a brake or hand bar (1) the throw of the valve is placed also in this way in his power. The bar (1) can be placed on the opposite side of the same segment plate ($v$) which serves for the bar ($u$).

Serious accidents have arisen from the difficulty and delay of bringing the gab hooks into play, in cases where an engine is wanted to be suddenly reversed, and among the various substitutes known to me there is, (especially after a little wear), a want of stability and of certainty of action which are of vital necessity and without which they soon become worse than useless.

Having thus described the nature of my improvement in the valve gearing of steam engines, I wish it to be understood that I make no claim to an adjustable sheave, nor to the use of a screw in this connection, but

What I claim herein as new and desire to secure by Letters Patent are—

The herein described devices for the adjustment of an eccentric sheave, that is to say, the sheave stock ($g$) arranged so as to traverse a bed plate ($e$) at right angles to the shaft or axle, and operated by a hand bar ($u$) through the medium of suitable levers ($t$) and yoke ($s$) connected with a sliding collar ($p$) from which projects a rack ($o$) which gears into a pinion ($n$) upon the screw ($k$) which actuates the sheave; and this I claim, whether or not the same be combined with the vibrating arm ($d$) and shifting pin $x$ as herein represented for variation of the throw.

In testimony whereof, I have hereunto set my hand before two subscribing witnesses.

MATHEW STUBBS.

Witnesses:
SALONICA THOMPSON,
PETER TOORKIS.